United States Patent
Tissler et al.

(10) Patent No.: US 6,887,815 B2
(45) Date of Patent: May 3, 2005

(54) POROUS MATERIAL, METHOD AND ARRANGEMENT FOR CATALYTIC CONVERSION OF EXHAUST GASES

(75) Inventors: Arno Tissler, Tegernheim (DE); David Habermacher, Colmar (FR); Edward Jobson, Romelanda (SE); Johan A. Martens, Huldenberg (BE); Lennart Cider, Mölndal (SE)

(73) Assignees: Volvo Technology Corporation, Göteborg (SE); Süd-Chemie AG, München (DE)

( * ) Notice: Subject to any disclaimer, the term of this patent is extended or adjusted under 35 U.S.C. 154(b) by 0 days.

(21) Appl. No.: 10/065,239

(22) Filed: Sep. 27, 2002

(65) Prior Publication Data

US 2003/0069125 A1 Apr. 10, 2003

(30) Foreign Application Priority Data

Sep. 28, 2001 (EP) .............................. 01850166

(51) Int. Cl.⁷ ................................. B01J 29/06
(52) U.S. Cl. ............................. 502/67; 502/60; 502/64; 502/66; 502/71; 502/74; 502/77
(58) Field of Search .............................. 502/60, 64, 66, 502/67, 71, 74, 77

(56) References Cited

U.S. PATENT DOCUMENTS 5,776,423 A * 7/1998 Feeley et al. ............ 423/239.2
5,935,529 A * 8/1999 Saito et al. ................. 422/177
5,968,466 A * 10/1999 Kharas ..................... 423/239.2

FOREIGN PATENT DOCUMENTS

| EP | 0 582 743 A1 | | 2/1994 |
|---|---|---|---|
| EP | 0 782 880 A1 | | 7/1997 |
| EP | 1 027 930 A1 | | 8/2000 |
| JP | 06 071181 A | | 3/1994 |
| JP | 2000 051706 A | | 2/2000 |
| JP | 2000-167390 | * | 6/2000 |
| WO | WO 99 29400 A1 | | 6/1999 |

* cited by examiner

Primary Examiner—Christina Johnson
(74) Attorney, Agent, or Firm—Novak, Druce & Quigg, LLP.

(57) ABSTRACT

Porous material (1) for catalytic conversion of exhaust gases including a carrier with a first porous structure (2, 2'), and an oxidation catalyst (OX) which in the presence of oxygen ($O_2$), according to a first reaction (3), has the ability to catalyze oxidation of nitrogen monoxide (NO) into nitrogen dioxide ($NO_2$) and, according to a second reaction (4, 4'), to catalyze oxidation of a reducing agent (HC), which oxidation catalyst (OX) is enclosed inside the first porous structure (2, 2'). The invention is characterized in that the oxidation catalyst (OX) includes iron (Fe) and silver (Ag) loaded on a zeolite. The invention also relates to a method and an arrangement and a catalytic conversion device that utilizes the porous material, and indicates an advantageous use of the porous material.

34 Claims, 3 Drawing Sheets

POROUS MATERIAL, METHOD AND ARRANGEMENT FOR CATALYTIC CONVERSION OF EXHAUST GASES

BACKGROUND OF INVENTION

1. Technical Field

The invention refers to a porous material for catalytic conversion of exhaust gases. The porous material includes a carrier with a first porous structure, and an oxidation catalyst which in the presence of oxygen, according to a first reaction, has the ability to catalyze oxidation of nitrogen monoxide into nitrogen dioxide and, according to a second reaction, to catalyze oxidation of a reducing agent, which oxidation catalyst is enclosed inside the first porous structure.

Preferably, the porous material also comprises a carrier with a second porous structure and a reduction catalyst that, in the presence of the reducing agent, is able to further catalyze reduction of nitrogen dioxide into nitrogen, whereby the reducing agent is at least partially consumed. The invention also relates to a method and arrangement for a catalytic conversion device that advantageously utilizes the porous material.

The invention may be applied within the field of catalytic conversion of exhaust gases that originate from internal combustion engines, particularly Lean Combustion engines (LC engines) and diesel engines.

The present invention may also be utilized for other exhaust gases that contain nitrogen oxides and that have an oxygen surplus, and which originate from stationary emission sources such as gas turbines, power plants and similar facilities.

2. Background Art

When attempting to reduce the emissions of nitrogen oxides ($NO_X$) from internal combustion engines, great effort has been taken to modify the combustion conditions in order to reduce the $NO_x$-emissions, while still maintaining the combustion efficiency at a satisfactory level.

Traditional techniques for the reduction of $NO_x$-emissions include Exhaust Gas Recirculation (EGR), as well as special designs for fuel injectors and combustion chambers. Other important engine parameters are compression, fuel injection time and fuel injection pressure. Techniques involving water injection, the use of fuel/water emulsions and so-called Selective Catalytic Reduction (SCR) by ammonia have also been employed. From these techniques, it has been found that one-sided optimizations of combustion efficiency often results in increased $NO_x$ emissions.

Today it is required that both fuel consumption and $NO_x$ emissions be minimized. There are also strong demands for reducing emissions of other chemical compounds that are potentially hazardous to the environment such as hydrocarbons.

Accordingly, there is an increased need for catalytic converters that also are able to treat exhaust gases from the so-called Lean Combustion (LC) engines. Therefore, a number of different catalytic converters have been developed and are well known in commercial applications such as motor vehicles.

Typically, conventional catalytic converters include one or several matrices, or monolith bricks as they sometimes referred. Such bricks or monoliths typically take the form of a ceramic honeycomb substrate, with through passages or cells, and can be furnished with a porous surface coating. Particles of a suitable catalyst are embedded in the surface of the matrix, and the design of the matrix is optimized to maximize the surface area over which catalytic reactions take place. Common catalysts are noble metals such as silver (Ag), platinum (Pt), palladium (Pd), rhodium (Rh), gallium (Ga), ruthenium (Ru) and mixtures thereof. There are also a number of other metals and metal oxides that can be used as catalysts. Such catalysts may have the ability to catalyze oxidation, affect reduction reactions, or both.

It is also known to use crystalline aluminum silicates, so-called zeolites, that are loaded with a suitable catalyst. The use of zeolites in connection with the catalytic conversion of exhaust gases are exemplarily disclosed in EP 0 499 931 and EP 0 446 408.

Furthermore, it is known to combine several different catalytic matrices, or to arrange a so-called after-burner in the catalytic conversion process. Such arrangements are, for example, disclosed in U.S. Pat. No. 5,465,574.

It is also previously known to use a honeycomb monolith of corrugated metal foil coated with a suitable catalytic material carried or supported on its surface.

It has also been suggested, for example in EP 0 483 708 A1, to combine a conventional ceramic catalytic converter with an electrically heatable catalytic converter in order to ensure that the optimum temperature for catalytic conversion is maintained.

From these examples, it can be appreciated that a number of different catalyst materials, devices, and arrangements utilized in catalytic conversion of exhaust gases are known.

From this, it would seem that simultaneous elimination of nitrogen oxides ($NO_x$) and hydrocarbons ($H_xC_x$) could take place over, for example, an Ag-catalyst, according to the simplified chemical reactions:

A) $NO_x + H_xC_y \rightarrow N_2 + H_2O + CO_2 + CD$ and

B) $O_2 + H_xC_y \rightarrow H_2O + CO_2$

In practice, however, it has been found that the following reaction predominates:

C) $NO_2 + H_xC_y \rightarrow N_2 + H_2O + CO_2$

It should be noted that the term $H_xC_y$ in the chemical reactions cited herein not only refers to hydrocarbons, but can also signify other reducing agents that include oxygen and/or sulphur. Accordingly, the reducing agent $H_xC_y$ could also be expressed as $H_xC_yO_zS_w$. Examples of reducing agents that might be present in exhaust gases are alkanes, alkenes, paraffines, alcohols, aidehydes, ketones, ethers or esters and different sulphur-containing compounds. Also CO and $H_2$ can act as reducing agents. Reducing agents found in exhaust gases can originate from the fuel or the combustion air, or it can be purposefully added to the exhaust gases.

It has earlier been found that the above-mentioned reaction according to C) is very rapid over, for example, Ag-catalysts. Acidic catalysts ($H^+$) and acidic zeolites, doped with Ag or other suitable catalysts, have been found to be selective in the sense that $NO_2$ will readily be converted, whereas NO will not. This can be of great disadvantage since NO is predominant in "lean" exhaust gases produced, for example, from LC-engines. Another problem is that the available amount of $NO_2$ can become limiting for the reduction of hydrocarbons ($H_xC_y$) or other undesired compounds. The doping of zeolites with silver (Ag) or other metals such as iron (Fe) is exemplarily disclosed in EP 0955080 and EP 0406474 which disclose low silica MFI as a good basic structure for use in the mentioned applications.

In order to solve this problem; that is to be able to reduce the amount of both NO and $H_xC_y$ in the exhaust gases, it has been suggested to combine an Ag-zeolite catalyst with a Pt-catalyst.

Normally, the following main reactions will take place over a conventional Pt-catalyst:

D) $NO+½O_2+NO_2$

E) $O_2+H_xC_y->H_2O+CO_2$

F) $2NO+H_xC_y->N_2O+H_2O+CO_2$

When using a conventional Ag-zeolite catalyst in combination with a conventional Pt-catalyst, all four reactions C), D), E) and F) will occur. However, since hydrocarbon ($H_xC_y$) is consumed in the chemical reactions E) and F), there is a risk that there will not be a sufficient amount of hydrocarbon ($H_xC_y$) left for the reaction with nitrogen dioxide ($NO_2$), according to reaction C). This results in an undesired residue of nitrogen dioxide ($NO_2$) in the catalytically converted exhaust gases, originating from reaction D).

Previous attempts have been made to solve this problem with different types of catalysts by such means as combining different catalysts, and by means of adding an additional amount of hydrocarbon to the exhaust gases in order to supply the reaction C) with a sufficient amount of hydrocarbon.

Many of the previous solutions, however, have been associated with the problem of undesired oxidation of hydrocarbons ($H_xC_y$) over at least some surfaces of the oxidation catalyst, which should preferably only catalyze oxidation of nitrogen monoxide (NO) into nitrogen dioxide ($NO_2$) according to reaction D).

Another problem associated with many previously known catalysts is that, during certain conditions, they catalyze according to reaction F) which produces dinitrogen oxide ($N_2O$). This reaction is undesired and it is preferred that the nitrogen oxides ($NO_x$) in the exhaust gases be converted into nitrogen ($N_2$) to the highest possible degree, and not into dinitrogen oxide ($N_2O$).

In WO 99/29400 it has been proposed to solve this problem by providing a porous material for catalytic conversion of exhaust gases, by which it is possible to selectively catalyze the oxidation of nitrogen monoxide (NO) into nitrogen dioxide ($NO_2$) and avoid catalytic oxidation of hydrocarbons ($H_xC_y$) or other reducing agents.

This is achieved by means of a porous material used for catalytic conversion of exhaust gases that include a carrier with a first porous structure, and an oxidation catalyst. In the presence of oxygen, the oxidation catalyst has the ability to catalyze oxidation of nitrogen monoxide into nitrogen dioxide, according to a first reaction. Furthermore, the oxidation catalyst, in itself, has the ability to catalyze oxidation of a reducing agent, according to a second reaction. According to WO 99/29400, the oxidation catalyst is enclosed inside the first porous structure, which first porous structure has pores with such dimensions that the reducing agent is sterically prevented from coming into contact with the oxidation catalyst. This will enable primarily the first reaction, out of said first and second reactions, to take place over the oxidation catalyst during the catalytic conversion of the exhaust gases.

According to WO 99/29400, the catalyst further includes a reduction catalyst enclosed in a second porous structure that has pores with greater dimensions than the pores in the first porous structure. This enables the reducing agent to react with the nitrogen dioxide ($NO_2$) according to a third reaction.

Using the described porous structures of two different sizes, as is described above, an improvement for a selective catalytic reaction is provided. There is, however, still a need for even better applications and methods for catalytic conversion of exhaust gases. For example, the porous material described uses strong oxidation agents, preferably such as platinum (Pt) and/or Palladium (Pd), and this puts high demands on the production. It is important that such strong oxidation agents do not contaminate the outside of the oxidation pore, since such a contamination would oxidate and consume some of the $H_xC_y$, thereby diminishing the reducing agent necessary for reducing $NO_2$ to $N_2$ according to the favorable third reaction.

Accordingly, a need has been recognized for an improved, selective oxidation catalyst material, that catalyzes oxidation of nitrogen monoxide (NO) into nitrogen dioxide ($NO_2$) and which does not catalyze oxidation of hydrocarbons.

Furthermore, there is also a recognized need for an effective combination of such a selective oxidation catalyst material for catalyzing a reaction that produces nitrogen dioxide ($NO_2$) and a reduction catalyst material for catalyzing a reaction in which nitrogen dioxide ($NO_2$) is reduced by hydrocarbons or other reducing agents into nitrogen ($N_2$).

SUMMARY OF INVENTION

The presently disclosed invention provides a porous material for catalytic conversion of exhaust gases, by means of which porous material it impossible to selectively catalyze the oxidation of nitrogen monoxide (NO) into nitrogen dioxide ($NO_2$) and avoid catalytic oxidation of hydrocarbons ($H_xC_y$) or other reducing agents.

This is achieved by means of a porous material used for catalytic conversion of exhaust gases that includes a carrier having a first porous structure, and an oxidation catalyst. In the presence of oxygen, the oxidation catalyst has the ability to catalyze oxidation of nitrogen monoxide into nitrogen dioxide, according to a first reaction. Furthermore, the oxidation catalyst in itself has the ability to catalyze oxidation of a reducing agent, according to a second reaction. According to the invention, the oxidation catalyst is enclosed inside the porous structure, which due to the presence of the catalytically active iron and silver, prevents the reducing agent from reacting in the oxidation catalyst or slows down the reaction of the reducing agent in the oxidation catalyst. As between the first and second reactions, this primarily enables the first reaction to take place over the oxidation catalyst during the catalytic conversion of the exhaust gases.

According to one embodiment of the invention, the oxidation catalyst includes iron and silver loaded on a zeolite, and the first porous structure can be a zeolite with MFI framework structure type.

In another aspect, the present invention provides a porous material for catalytic conversion of exhaust gases, wherein primarily only desired reactions take place, and as a result of which the contents of NO, NO and $H_xC_y$ present in the catalytically converted exhaust gases are effectively decreased, and the resulting conversion products are primarily nitrogen ($N_2$), carbon dioxide ($CO_2$) and water ($H_2O$), and not dinitrogen oxide ($N_2O$).

This aspect of the invention is achieved by means of a porous material that further includes a carrier with a second porous structure and a reduction catalyst. In the presence of a reducing agent, the reduction catalyst is able to selectively catalyze reduction of nitrogen dioxide into nitrogen, according to a third reaction, whereby the reducing agent participates in the third reaction and is at least partially consumed. Thereby, the reduction catalyst is located in the second porous structure, which has such dimensions that the reducing agent can come into contact with the reduction catalyst in order to enable the third reaction to take place.

In yet another aspect, the present invention provides a method for catalytic conversion of exhaust gases in which oxidation of nitrogen monoxide into nitrogen dioxide over an oxidation catalyst is achieved, according to a first reaction, whereby the oxidation catalyst also has the ability to, according to a second reaction, catalyze oxidation of a reducing agent. According to the invention, however, the reducing agent is prevented from coming into contact with the oxidation catalyst or that the reaction of the reducing agent in the oxidation catalyst is slowed down, as a result of which primarily the first reaction, out of said first and second reactions, takes place over the oxidation catalyst, due to the presence of iron end silver, as a result of which primarily the first reaction, out of said first and second reactions, takes place over the oxidation catalyst.

In still another aspect, the present invention involves an advantageous use of the porous material in such a way that it provides for: the oxidation of nitrogen monoxide into nitrogen dioxide, the reduction of nitrogen dioxide into nitrogen, and catalytic conversion of exhaust gases which have an oxygen surplus.

The invention may be viewed more broadly as a catalytic conversion device for exhaust gases that is includes the specified porous material, as well as an incorporating vehicle of such unique apparatus.

It should be appreciated, that in the context of the invention(s) as described above, the first, second and third reactions mentioned above may not be only one separate reaction step, but may also be a series of reaction steps.

BRIEF DESCRIPTION OF DRAWINGS

In the following, the invention will be described in greater detail with reference to the attached drawings and graphs in which.

DETAILED DESCRIPTION

In the following, several inventive aspects of a catalytic invention for exhaust gases will be described that are based on a porous material and which are explained, at least in part, by reference to the attached drawings.

Figure 1:
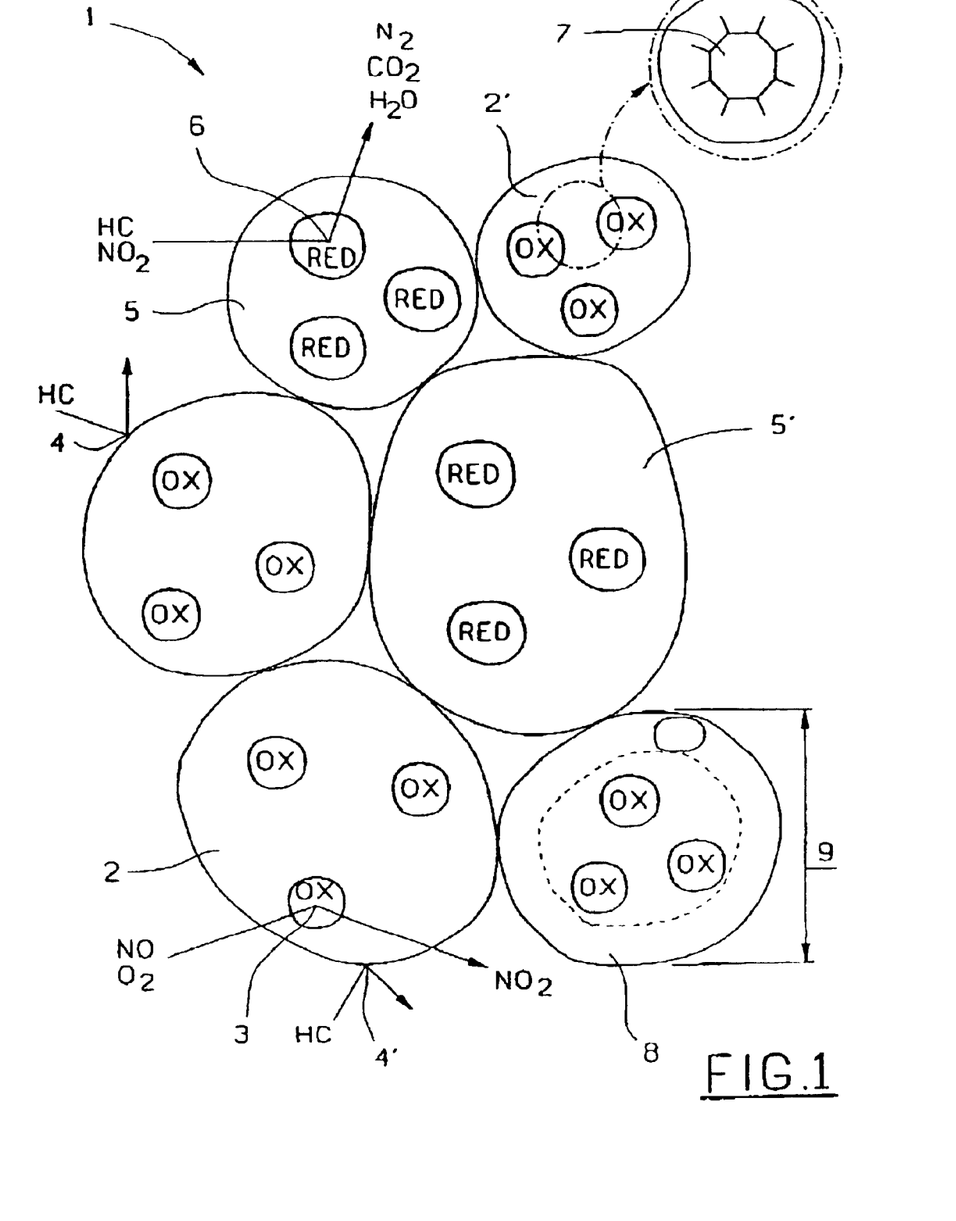
FIG. 1 shows a schematic view of a portion of a porous material according to the invention, also with an enlarged view seen from inside a pore in the porous material. The major chemical reactions that occur during the catalytic conversion of exhaust gases are also indicated.
Figure 2:
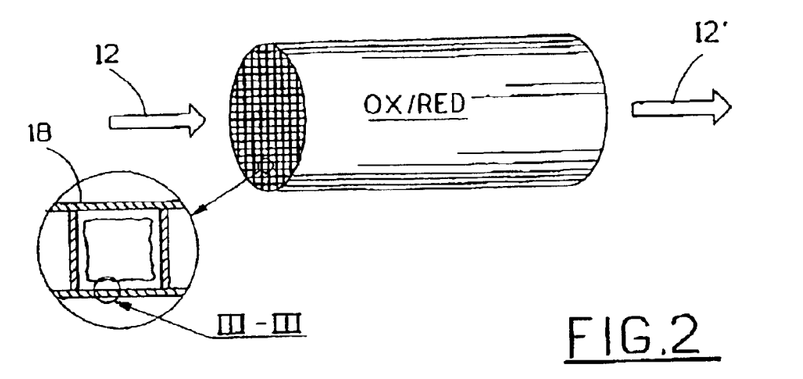
FIG. 2 schematically depicts an embodiment of the porous material configured according to the invention, with an enlarged detailed view of a portion of the porous material including a supporting substrate.

In this regard, a porous material 1 is depicted in FIG. 1 which comprises, that is includes, a carrier with a first porous structure 2, 2'. An oxidation catalyst (OX) is enclosed inside the first porous structure 2, 2'. In the presence of oxygen ($O_2$), the oxidation catalyst (OX) has the ability to catalyze oxidation of nitrogen monoxide (NO) into nitrogen dioxide ($NO_2$), according to a first reaction 3. Furthermore, the oxidation catalyst (OX) in itself has the ability to catalyze oxidation of a reducing agent (HC), according to a second reaction 4, 4'. According to the invention, however, such oxidation of a reducing agent according to the second reaction 4, 4' is not desired, since the reducing agent (HC) is more useful in a third reaction, as will become apparent hereinbelow.

In order to prevent the undesired second reaction 4, 4' from occurring, the oxidation catalyst (OX) is enclosed inside the first porous structure 2, 2', and the oxidation catalyst (OX) exemplarily includes iron (Fe) and silver (Ag) loaded on a zeolite. Due to the iron (Fe) and silver (Ag) in the oxidation catalyst (OX) in the first porous structure 2, 2', the reducing agent (HC) is prevented from reacting in the oxidation catalyst (OX) or the reaction of the reducing agent (HC) in the oxidation catalyst (OX) is at least slowed down. This will enable primarily the desired first reaction 3, out of said first and second reactions, to take place over the oxidation catalyst (OX) during the catalytic conversion of exhaust gases. In this context, the term "first porous structure" primarily refers to internal micro-pores in the carrier material or micro-pores between carrier particles or grains. The first porous structure (2, 2') may advantageously comprise a zeolite with MFI framework structure type.

Preferably, the first porous structure (2, 2') includes a silica oxide structure where the oxidation catalyst (OX) comprises iron (Fe) and silver (Ag). The presence of both Iron (Fe) and silver (Ag) has proven to be advantageous in many aspects. One advantage is that iron (Fe) and silver (Ag) are not as strong oxidation agents as, for example, Pt. This is an advantage in that even if some iron (Fe) and/or silver (Ag) has landed upon the outside of the oxidation catalyst (OX), only a small part of the reducing agent (HC) is oxidated. The use of iron (Fe) and silver (Ag) in combination in an oxidation catalyst (OX) according to the invention, has empirically proven to give a surprisingly high conversion of $NO_x$ into $N_2$ and hydrocarbons into carbon dioxide and water compared to previously known oxidation catalysts consisting of for example, platinum. rhodium, or silver.

As mentioned before, it is known to use iron in combination with materials with strong catalytic features such as platinum. It is also known to use silver in combination with materials with strong catalytic features such as platinum. However, since both iron and silver are relatively weak catalyst materials, it has not previously been suggested to combine iron and silver as taught by the present invention in order to get a high conversion of $NO_X$ into $N_2$. On the contrary, all previously known catalysts use at least one strong catalyst material in order to gain sufficient conversion of $NO_X$ into $N_2$. The use of the combination of the relatively weak catalyst materials iron and silver, without any strong catalyst material has, however, shown surprisingly high conversion features of $NO_X$ into $N_2$; that is, using two relatively weak catalyst materials such as iron and silver has not been the natural choice to make when wanting to enhance the rate of conversion of $NO_X$ into $N_2$. The more natural and traditional choice has been to elaborate with stronger catalytic materials. But the use of a stronger catalytic material detrimentally enhances the risk of consuming the reducing agent (HC) by oxidation, thereby diminishing the amount of reducing agent (HC).

Preferably, the porous material 1 further includes a carrier with a second porous structure 5, 5', in which a reduction catalyst (RED) is located. In this context, the term "second porous structure" can include internal micro-pores in the carrier material, or cavities or channels between carrier particles, but also cavities inside or channels through the porous material such as macro-pores. In the presence of a reducing agent (HC), the reduction catalyst (RED) is able to selectively catalyze reduction of nitrogen dioxide ($NO_2$) into nitrogen ($N_2$) according to a third reaction 6 that is shown schematically in FIG. 1. Thereby, the reducing agent (HC) participates in the third reaction 6 and is at least partially consumed.

According to the invention, the reduction catalyst (RED) is located in the second porous structure 5, 5', which has such dimensions that the reducing agent (HC) can come into contact with the reduction catalyst (RED). This enables the desired third reaction G to take place during the catalytic conversion of exhaust gases. According to one embodiment of the porous material, both the first 2, 2' and the second 5, 5' porous structures are provided in the same layer or coating of the porous material.

If desired, however, the first 2, 2' and the second 5, 5' porous structures can be provided in different layers/coatings of the porous material. This might be an advantage, depending on the composition of the exhaust gases which are to be catalytically converted.

In one embodiment of the porous material, the carrier with the second porous structure 5, 5' is adapted to the molecule size and/or the adsorption properties of the reducing agent (HC) or agents, which is/are expected to occur in the exhaust gases.

In another embodiment of the porous material, the ratio between the oxidation catalyst (OX) and the reduction catalyst (RED) has been optimized so that the production of nitrogen dioxide ($NO_2$), according to the first reaction 3, essentially corresponds to the consumption of nitrogen dioxide ($NO_2$), according to the third reaction 6.

Figure 4A:
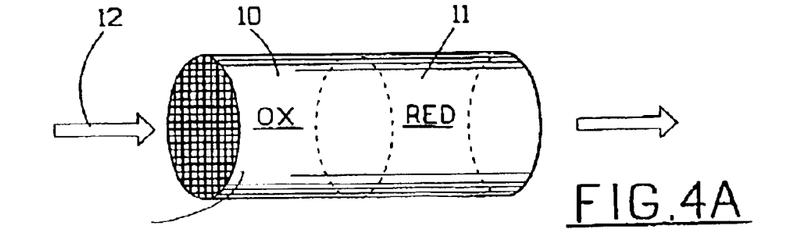
FIG. 4A schematically shows an embodiment of a porous material according to the invention having a first portion and a second portion.
Figure 4B:
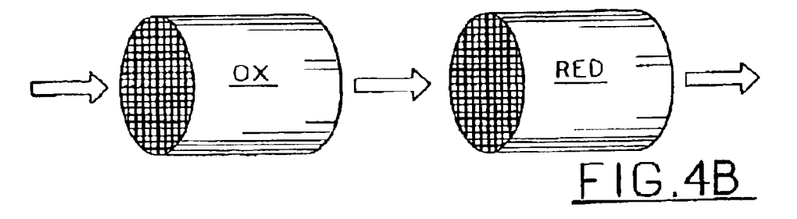
FIG. 4B schematically shows another embodiment of the invention, wherein the porous material according to the invention includes two separate and different parts that are intended to be used together in a single catalytic conversion process.

In still another embodiment of the invention (FIG. 4A), the porous material further includes a first portion 10 and a second portion 11, wherein the first portion 10 is intended to receive exhaust gases 12 before the second portion 11 during the catalytic conversion process. Thereby, the first portion 10 contains a larger quantity of the oxidation catalyst (OX) than the second portion 11, and the second portion 11 contains a larger quantity of the reduction catalyst (RED) than the first portion 10. Accordingly, in a flow of exhaust gases, the first reaction 3, producing $NO_2$, will take place upstream of the third reaction 6, which consumes $NO_2$. As shown in FIG. 4B, it is also contemplated that the first and second portion may be separated from each other, as long as they are used for catalytic conversion in the same conversion process. Thus, a catalytic conversion device for exhaust gases according to the present invention(s) includes this special configuration of porous materials, and in another aspect takes the form of a catalytic conversion device that includes a first and a second portion 10, 11 configured according to the description found above.

According to one embodiment of the porous material, the first 2, 2' and/or the second 5, 5' porous structure is provided in a carrier that is a zeolite crystal structure. Furthermore, both the first 2, 2' and the second 5,5' porous structures can be provided in carriers of zeolite type, wherein the first porous structure 2, 2' is preferably provided in a first zeolite 14 and the second porous structure in a second zeolite 15.

As earlier mentioned, the first porous structure 2, 2' and, accordingly then also the first zeolite 14, should provide suitable properties in order to prevent the earlier-mentioned and undesired second reaction from taking place.

Figure 3A:
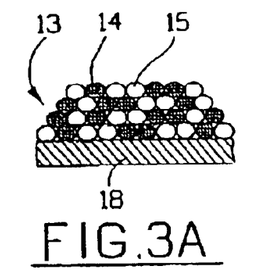
FIG. 3A schematically shows an enlarged detailed view of a portion of the enlarged detailed view in FIG. 2, and depicts a variant of the porous material according to the invention including a physical mixture of two different zeolite carriers.

There are a number of different ways of combining different zeolites in a porous material according to the present invention. Accordingly, the porous material can comprise a physical mixture 13 of the first zeolite 14 and the second zeolite 15 as exemplarily shown in FIG. 3A.

Figure 3B:
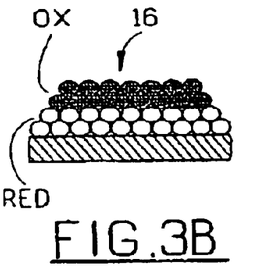
FIG. 3B schematically shows another enlarged detailed view of a portion of the enlarged detailed view in FIG. 2, and depicts another variant of the porous material according to the invention that includes a layered structure of two different zeolite carriers.
Figure 3C:
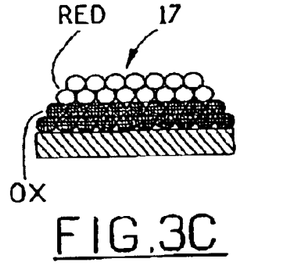
FIG. 3C schematically shows an alternative to the layered structure in FIG. 3B.

Furthermore, the porous material can include a layered structure 16, 17 of the first zeolite and the second zeolite as depicted in FIGS. 3B and 3C. Different layers may also be applied or coated onto different supporting substrates 18 or different surfaces of a substrate 18.

In certain applications, it may be preferred to arrange the layered structure 17 so that, in a flow of exhaust gases, the second zeolite will encounter the exhaust gases before the first zeolite. This might be the case, for example, when the exhaust gases that are to be converted contain a proportionately high content of $NO_2$, but a low content of NO.

In other applications, such as when the content of NO in the exhaust gases is proportionally high but the content of $NO_2$ is low, it might be desirable to arrange the layered structure 16 in the opposite way; that is, with the first zeolite outside the second zeolite.

According to one embodiment of the porous material, a layered structure is achieved by means of the second zeolite 15, which provides the second porous structure 5, 5' being crystallized onto the first zeolite 14, which provides the first porous structure 2, 2'. This can be done by means of so-called over-growth.

Another embodiment of the porous material aims at further reduction of the occurrence of the earlier-mentioned, undesired second reaction. In this embodiment, the content of oxidation catalyst (OX) has been reduced in the outer layers B of the first zeolite by means of partial ion exchange as indicated in FIG. 1. Methods for altering the penetration depth and dispersion of the catalytically active metals are well known to the skilled person and will not be described in any greater detail.

In another embodiment of the porous material, an additional zeolite crystal layer with a reduced content of oxidation catalyst (OX) has been crystallized onto the first zeolite, by means of so-called over-growth. Thereby, the additional layer advantageously comprises a zeolite which provides a porous structure with smaller pores/entrances than the first zeolite. In this way, undesired reducing agent can more effectively be prevented from getting inside the internal pore structure of the first zeolite, at the same time as the nitrogen oxide (NO) will be admitted and can move freely inside the internal pore structure.

The dimensions of the crystal grains in the zeolite crystal structures can be used in order to facilitate desired chemical reactions, and in order to prevent undesired chemical reactions. Different crystal structures can be achieved in several different ways, for example by means of the choice of the crystallization conditions and the choice of zeolite type. Also, the internal pore structure of the zeolites is influenced by the choice of zeolite type.

Thus, according to one embodiment of the porous material, the size 9 and shape of the crystal grains in the crystal structure of the first zeolite, has been optimized both in order to prevent reaction of the reducing agent (HC) and to allow oxidation of NO to $NO_2$. The optimization of the grain size is important since it makes it possible to maximize the oxidation of NO into $NO_2$ and to minimize the oxidation of HC.

In another embodiment of the porous material, a proportionately small pore size, in the crystal structure of the first zeolite which provides the first porous structure 2, 2', has been achieved by means of selecting a zeolite with MFI framework type. Examples of such framework types are listed in such standards as the Atlas of Zeolite Framework Types. This zeolite is loaded with iron and silver to reduce the reaction of the reducing agent (HC).

As earlier mentioned, the porous material according to the invention has the ability to catalyze oxidization of nitrogen monoxide (NO) into nitrogen dioxide ($NO_2$), and preferably also the ability to selectively catalyze reduction of nitrogen dioxide (($NO_2$) into nitrogen ($N_2$) in the presence of a reducing agent (HC). In this way, the reducing agent (HC) may be any suitable reducing agent that is present in, or added to, the exhaust gases that are to be catalytically convened.

It is an advantage, however, if the reducing agent (HC) in the exhaust gases is a hydrocarbon ($H_X C_Y$) or a chemical compound comprising oxygen and sulphur ($H_X C_{YO Z} S_W$). These compounds can originate from the fuel that is combusted and will, as earlier mentioned, be at least partially consumed according to the earlier-mentioned third reaction 6 over the reduction catalyst (RED). Alternative fuels, such as rape methyl ether, may produce oxygen-containing compounds, whereas sulphur is frequently present in most fuels.

The reduction catalyst (RED) in the second porous structure 5, 5' might be of any suitable type. However, in the porous material according to the invention, the reduction catalyst (RED) preferably includes Bronstedt acid sites, silver (Ag), Iron (Fe), copper (Cu), Rhodium (Rh), Cobalt (Co), Indium (In), Iridium (Ir) or combinations thereof. In the porous material of the present invention, acidic zeolite catalysts are preferred as reduction catalysts (RED).

Herein, the term "porous material" should be regarded as including the entire structure/mass which might be present inside a unit for the catalytic conversion of exhaust gases. Accordingly, the term "porous" should be understood both in a microscopic and in a macroscopic sense; that is, the porous material could have elements which in themselves are not porous to exhaust gases. However, the material structure as a whole, i.e. the "porous material," will allow the exhaust gases which are to be catalytically converted to pass therethrough. It should also be noted that embodiments in which the porous material is composed of several separated parts, each having different structures and functions, are conceivable as long as they are used in the same catalytic conversion process.

The porous material, according to the invention, may be coated onto one or several suitable substrates 18 or matrixes in order to provide a carrier or several carriers; which embody the first and/or the second porous structures. Suitable substrates for this purpose are well known and will not be described in any greater detail.

Accordingly, the substrate 18 may be a metal substrate of a previously known type. The substrate 18 may also be a supporting, previously known, honeycomb structure of a suitable material, with or without catalytic activity.

It should also be noted that the term "porous structure" used herein should be understood to include both micro-pores and macro-pores of the porous material. Accordingly, internal micro-pores, cavities between carrier particles, channels inside or through the porous material, and related structures are all included within the scope of "porous structure" according to the presently described inventions.

Figure 5:
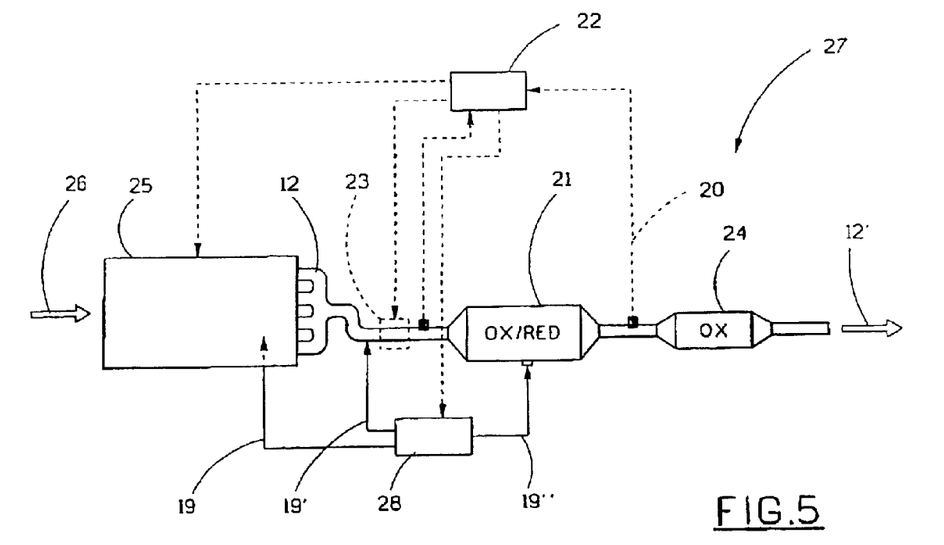
FIG. 5 shows a schematic process diagram of an arrangement for catalytic conversion of exhaust gases in an exhaust system according to one embodiment of the invention.

According to one embodiment of the invention, the new methods can further include reduction of nitrogen dioxide ($NO_2$) into nitrogen ($N_2$) over a reduction catalyst (RED) in the presence of a reducing agent (HC) according to a third reaction 6. The reducing agent (HC) participates in the third reaction 6 and is at least partially consumed. In this way, catalytically converted exhaust gases 12' as depicted in FIG. 5, have a reduced content of nitrogen monoxide (NO), nitrogen dioxide ($NO_2$) and reducing agent (HC) and a proportionately low content of dinitrogen oxide ($N_2O$), are obtained. Furthermore, the converted exhaust gases will have a reduced content of carbon monoxide (CO).

When desirable, an additional amount 19, 19', 19" of reducing agent (HC) can be added with a suitable injection device 28, before reduction takes place over the reduction catalyst (RED), according to the third reaction 6 as depicted in FIGS. 1 and 5. In this way, the stoichiometrics of the occurring chemical reactions can be influenced so that the catalytic conversion becomes as complete as possible. In internal combustion engines, it is also possible to increase or regulate the amount of available reducing agent by means of so-called engine parameter tuning. This can be done by, for example, fuel injection timing, valve timing, post-injection, control of charging pressure and/or fuel injection pressure, EGR, transmission ratio, and the like.

Advantageously, the additional amount 19, 19', 19" of reducing agent (HC) can be regulated on the basis of a measured or previously mapped content 20 of reducing agent (HC) and/or nitrogen oxides ($NO_X$) in the exhaust gases 12, 12'.

The measured content 20 of reducing agent (HC) or nitrogen oxides ($NO_X$) in the catalytically converted exhaust gases (12') can also be used in a diagnostic control system 22, providing an indication of the status of the catalytic conversion.

The exhaust gases 12 can also be passed through a device having the ability to store and when necessary release nitrogen oxides ($NO_X$) before the oxidation over the oxidation catalyst (OX), according to the first reaction 3. Such $NO_X$-absorbers are well-known to the person skilled in the art and will not be described in any greater detail herein for that reason.

Before the oxidation, the exhaust gases 12 can also be passed through a previously known device having the ability to store, and when necessary release, reducing agent (HC), such as hydrocarbon. This embodiment is useful, for example, in cold starts of an internal combustion engine.

In order to ensure that the oxidation catalyst (OX) and/or the reduction catalyst (RED) is functioning in the best possible way; that is, are within an active temperature interval, the temperature of the exhaust gases can be regulated before the passage through the porous material 21 according to the invention. This can be done with any previously known device 23 that is suitable for the purpose.

In order to further improve the catalytic conversion, the exhaust gases can be allowed to pass a second oxidation catalyst 24, over which oxidation of residues of reducing agent and/or carbon monoxide can take place. In this way, it is ensured that the exhaust gases, which have been at least partially catalytically converted over the porous material 21, reach a sufficiently high degree of catalytic conversion.

It is advantageous in the methods of the present invention(s) if the exhaust gases 12 originate from an internal combustion engine 25, and the reducing agent (HC) comprises a hydrocarbon ($H_xC_y$) and/or a chemical compound ($H_xC_yO_zS_w$) further comprising oxygen and/or sulphur.

Furthermore, the fuel 26 consumption of the internal combustion engine 25 will influence the chemical composition of the exhaust gases 12. Legislative regulations are imposed both on fuel consumption and the residue content of nitrogen oxides ($NO_x$) in the catalytically converted exhaust gases 12'. In one embodiment of the present invention, both the fuel consumption of the internal combustion engine, and the residue content of nitrogen oxides ($NO_x$) in the catalytically converted exhaust gases 12', are regulated in order to fulfill relevant legislative regulations.

In one preferred method according to the invention, the internal combustion engine 25 is a diesel engine and the reducing agent (HC) originates from internal combustion in said diesel engine.

When diesel engines are concerned, an additional amount 19 of reducing agent (HC) can advantageously be supplied to the engine via a fuel injector of the diesel engine and/or via a separate injector for additional reducing agent.

The present invention(s) preferably use a porous material for catalytic conversion of exhaust gases 12, which have an oxygen surplus and, accordingly, are difficult to convert in conventional catalytic converters such as three-way converters. In such use, the porous material provides functions both for the oxidation of nitrogen monoxide (NO) into nitrogen dioxide ($NO_2$) and for the reduction of nitrogen dioxide ($NO_2$) into nitrogen ($N_2$).

Another aspect of the present invention takes the form of an arrangement 27 for catalytic conversion of exhaust gases that originate from an internal combustion engine 25. In this regard, the arrangement includes a porous material 21 according to the above teachings, and furthermore that operates according to the methods also described herein.

According to yet another embodiment of the porous material according to the invention, the first porous structure 2, 2' on an average exhibits smaller entrances 7 for the reducing agent (HC) than the second porous structure 5, 5'. In this way, the reducing agent (HC) is prevented from getting into contact with the oxidation catalyst (OX) that is enclosed inside the first porous structure 2, 2', but is not prevented from coming into contact with the reduction catalyst (RED) in the second porous structure 5, 5'. The pores in the first porous structure 2, 2' preferably have a primary effective size of 3–4.5 angstroms Thus, the oxidation catalyst (OX) enclosed inside the first porous structure 2, 22 may have such dimensions that the reducing agent (HC) 4, 4' is sterically prevented from coming into contact with the oxidation catalyst (OX). In this context, the term "first porous structure" primarily refers to internal micro-pores in the carrier material or micro-pores between carrier particles or grains.

Even in the case of using the above mentioned pores with a smaller entrance, the use of iron (Fe) and silver (Ag) surprisingly enhances the desired conversion of $NO_x$ to $N_2$ In the following, examples are presented of possible materials as well as the result of a test that compares the iron/silver combination according to the invention with a previously known platinum based catalyst:

MFI:
Free Diameter:
10 rings 5.1×5.5 angstroms
10 rings 5.3×5.6 angstroms
MOR:
Free Diameter:
12 rings 6.5×7.0 angstroms
8 rings 2.6×5.7 angstroms In the following, an evaluation of catalytic conversion efficiency is demonstrated. In order to describe the improved conversion of exhaust gases via the present invention(s) compared to previously known catalysts, the result of a test which compares the iron/silver combination according to the invention with a previously known platinum based catalyst will be described below, and the results are presented in Table 1.

The test is performed on two catalysts that differ only in the use of different catalytically active material in the oxidation catalyst part of the catalyst. The first catalyst is a dual pore size catalyst according to the teachings of WO 99/29400. Therein, DP-Pt is found with an oxidation catalyst pore treated with platinum. The second catalyst is a catalyst according to the invention with an oxidation catalyst pore treated with iron and silver.

Table 1 lists temperatures at which the conversion of NO to $N_2$ was obtained. The test also shows the performance of a Fe-MFI zeolite by adding silver. A further gain in NOx conversion is obtained by adding mordenite zeolite.

Before the evaluation, the obtained Ag—Fe-MFI and H-MOR, and physical mixtures thereof were compressed into pellets; that is, model porous samples, and the catalytic conversion efficiency of the different porous samples was evaluated.

In the prepared porous samples, the Ag—Fe-MFI were intended to provide the earlier-mentioned NO-oxidation function, whereas the H-MOR were intended to provide the earlier-mentioned $NO_2$-reduction function.

The results of the test with decane, HC/NOx=3 is presented below in the table::

TABLE 1

| catalyst | DP-Pt catalyst | invention |
|---|---|---|
| NO to $N_2$ conversion | 26.5 | 48.4 |
| NO to $N_2O$ formation | 13.6 | 0.2 |

According to this reported test, the present invention enhances the degree of conversion from 26% to 48% compared to the DP-Pt catalyst, when using the same test conditions.

The present invention is not restricted to the described embodiments, but may be altered within the scope of the claims in keeping with the spirit of the invention.

What is claimed is:

1. A porous material for catalytic conversion of exhaust gases comprising a carrier with a first porous structure enclosing an oxidation catalyst (OX), consisting essentially of iron (Fe) and silver (Ag), which in the presence of oxygen and according to a first reaction has the ability to catalyze oxidation of nitrogen monoxide into nitrogen dioxide and, according to a second reaction, to catalyze oxidation of a reducing agent (HC), said porous material further comprising: a carrier with a second porous structure having located therein a reduction catalyst (RED) that in the presence of the reducing agent (HC) is able to selectively catalyze reduction of nitrogen dioxide into nitrogen, the second porous structure having dimensions such that the reducing agent (HC) can come into contact with the reduction catalyst (RED) in order to enable a third reaction to take place wherein the reducing agent (HC) participates and is at least partially consumed.

2. The porous material according to claim 1, wherein the first porous structure comprises a zeolite with MFI framework type structure.

3. The porous material according to claim 2, wherein the oxidation catalyst (OX), due to the iron (Fe) and silver (Ag), is arranged to prevent the reducing agent (HC) from reacting in the oxidation catalyst (OX) or to slow down the reaction of the reducing agent (HC) in the oxidation catalyst (OX) in order to enable primarily the first reaction, out of said first and second reactions, to take place over the oxidation catalyst (OX) during the catalytic conversion of the exhaust gases.

4. The porous material according to claim 1, wherein the first porous structure on an average exhibits smaller entrances for the reducing agent (HC) than the second porous structure.

5. The porous material according to claim 1, wherein the first and the second porous structures are provided in different coating layers of the porous material.

6. The porous material according to claim 1, wherein the carrier with the second porous structure has a molecule size and/or adsorption properties of the reducing agent (HC).

7. The porous material according to claim 1, wherein the ratio between oxidation catalyst (OX) and reduction catalyst (RED) is optimized so that the production of nitrogen dioxide, according to the first reaction, essentially corresponds to the consumption of nitrogen dioxide according to the third reaction.

8. The porous material according to claim 1, further comprising: a first portion and a second portion, wherein the first portion is intended to receive the exhaust gases before the second portion during the catalytic conversion, and the first portion contains a larger quantity of the oxidation catalyst (OX) than the second portion, whereas the second portion contains a larger quantity of the reduction catalyst (RED) than the first portion.

9. The porous material according to claim 1, wherein the porous material comprises a second zeolite, providing the second porous structure.

10. The porous material according to claim 1, wherein the reducing agent (HC), which is at least partially consumed according to the third reaction, is a hydrocarbon ($H_XC_Y$) and a chemical compound ($H_XC_YO_ZS_W$) that further comprises oxygen and sulphur.

11. The porous material according to claim 1, wherein the second porous structure incorporates the reduction catalyst (RED) as acidic catalytic sites.

12. The porous material according to claim 1, wherein the reduction catalyst (RED) comprises at least one of Bronstedt acid sites, silver (Ag), iron (Fe) copper (Cu), Rhodium (Rh), Indium (In), Iridium (Ir), and combinations thereof.

13. The porous material according to claim 1, wherein the first and the porous structures are provided in carriers attached to a substrate.

14. The porous material according to claim 4, wherein the entrances of first porous structure have a size range from about 3.0 angstroms to about 4.5 angstroms.

15. A porous material for catalytic conversion of exhaust gas, said porous material comprising: a coating layer including a carrier with a first porous structure enclosing an oxidation catalyst (OX) comprising iron (Fe) and silver (Ag) which in the presence of oxygen and according to a first reaction has the ability to catalyze oxidation of nitrogen monoxide into nitrogen dioxide and according to a second reaction, to catalyze oxidation of a reducing agent (HC), said porous material further comprising: a carrier with a second porous structure provided in the same coating layer as the first porous structure, the second porous structure having located therein a reduction catalyst (RED) that in the presence of the reducing agent (HC) is able to selectively catalyze reduction of nitrogen dioxide into nitrogen, the second porous structure having dimensions such that the reducing agent (HC) can come into contact with the reduction catalyst (RED) in order to enable a third reaction to take place wherein the reducing agent (HC) participates and is at least partially consumed.

16. A porous material for catalytic conversion of exhaust gases, said porous material comprising: a carrier with a first porous structure comprising a first zeolite enclosing an oxidation catalyst (OX) comprising iron (Fe) and silver (Ag) which in the presence of oxygen and according to a first reaction has the ability to catalyze oxidation of nitrogen monoxide into nitrogen dioxide and according to a second reaction, to catalyze oxidation of a reducing agent (HC), said porous material further comprising: a carrier with a second porous structure comprising a second zeolite, such that the porous material comprises a physical mixture of the first zeolite and the second zeolite that has located therein a reduction catalyst (RED) that in the presence of the reducing agent (HC) is able to selectively catalyze reduction of nitrogen dioxide into nitrogen, the second porous structure having dimensions such that the reducing agent (HC) can come into contact with the reduction catalyst (RED) in order to enable a third reaction to take place wherein the reducing agent (HC) participates and is at least partially consumed.

17. The porous material according to claim 15 or 16, wherein the first structure comprises a zeolite with MFI framework type structure.

18. The porous material according to claim 17, wherein the oxidation catalyst (OX), due to the iron (Fe) and silver (Ag), is arranged to prevent the reducing agent (HC) from reacting in the oxidation catalyst (OX) or to slow down the reaction of the reducing agent (HC) in he oxidation catalyst (OX) in order to enable primarily the first reaction, out of said first and second reactions, to take place over the oxidation catalyst (OX) during the catalytic conversion of the exhaust gases.

19. The porous material according to claim 15 or 16, wherein the first porous structure on an average exhibits smaller entrances for the reducing agent (HC) than the second porous structure.

20. The porous material according to claim 15 or 16, wherein the first and the second porous structures are provided in different coating layers of the porous material.

21. The porous material according to claim 15 or 16, wherein the carrier with the second porous structure has a molecule size and/or adsorption properties of the reducing agent (HC).

22. The porous material according to claim 15 or 16, wherein the ratio between oxidation catalyst (OX) and reduction catalyst (RED) is optimized that the production nitrogen dioxide, according to the first reaction, essentially corresponds to the consumption of nitrogen dioxide according to the third reaction.

23. The porous material according to claim 15 or 16, further comprising: a first portion and a second portion, wherein the first portion is intended to receive the exhaust gases before the second portion during the catalytic conversion, and the first portion contains a larger quantity of the oxidation catalyst (OX) than the second portion, whereas the second portion contains a larger quantity of the reduction catalyst (RED) than the first portion.

24. The porous material according to claim 15 or 16, wherein the porous material comprises a second zeolite, providing the second porous structure.

25. The porous material according to claim 16, wherein the porous material comprises a layered structure of the first zeolite and the second zeolite, wherein said first and second zeolites, depending on the expected composition of the exhaust gases which are to be catalytically converted, have been arranged in relation to each other in said layered structure, and the second zeolite encounters the exhaust gases before the first zeolite during the catalytic conversion.

26. The porous material according to claim 16, wherein the second zeolite, providing the second porous structure, has been applied by over-growth onto the first zeolite, providing the first porous structure.

27. The porous material according to claim 16, wherein the content of oxidation catalyst (OX) has been reduced in outer layers of the first zeolite by means of regulating penetration depth and dispersion.

28. The porous material according to claim 16, wherein an additional zeolite crystal layer with a reduced content of oxidation catalyst (OX) has been crystallized onto the crystal structure of the first zeolite.

29. The porous material according to claim 16, wherein the crystal structure of the first zeolite comprises crystal grains having a grain size and a shape which has been optimized both in order to prevent reaction of the reducing agent (HC), and in order to allow effective oxidation of NO to $NO_2$.

30. The porous material according to claim 15 or 16, wherein the reducing agent (HC), which is at least partially consumed according to the third reaction, is a hydrocarbon ($H_XC_Y$) and a chemical compound ($H_XC_YO_ZS_W$) that further comprises oxygen and sulphur.

31. The porous material according to claim 15 or 16, wherein the second porous structure incorporates the reduction catalyst (RED) as acidic, catalytic sites.

32. The porous material according to claim 15 or 16, wherein the reduction catalyst (RED) comprises at least one of Bronstedt acid sites, silver (Ag), iron (Fe) copper (Cu), Rhodium (Rh), Indium (In), Iridium (ir), and combinations thereof.

33. The porous material according to claim 15 or 16, wherein the first and the second porous structures are provided in carriers attached to a substrate.

34. The porous material according to claim 15 or 16, wherein the first porous structure on an average exhibits smaller entrances for the reducing agent (HC) than the second porous structure and the entrances of the first porous structure have a size range from about 3.0 angstroms to about 45 angstroms.

* * * * *